US012798778B2

(12) United States Patent
Merritt et al.

(10) Patent No.: US 12,798,778 B2
(45) Date of Patent: Nov. 17, 2026

(54) ENVIRONMENTAL CONTROL SYSTEM UTILIZING INTEGRATED VAPOR COMPRESSION SYSTEM AND FOUR-WHEEL AIR CYCLE MACHINE

(71) Applicant: Hamilton Sundstrand Corporation, Charlotte, NC (US)

(72) Inventors: Brent J. Merritt, Southwick, MA (US); Viktor Kilchyk, Williamsville, NY (US); Lance Bartosz, Granby, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 84 days.

(21) Appl. No.: 18/788,233

(22) Filed: Jul. 30, 2024

(65) Prior Publication Data

US 2026/0035077 A1 Feb. 5, 2026

(51) Int. Cl.
*B64D 13/06* (2006.01)
*F25B 25/00* (2006.01)

(52) U.S. Cl.
CPC ............ *B64D 13/06* (2013.01); *F25B 25/005* (2013.01); *B64D 2013/0648* (2013.01); *B64D 2013/0674* (2013.01)

(58) Field of Classification Search
CPC ............ B64D 13/06; B64D 2013/0648; B64D 2013/0674; B64D 2013/0666; B64D 2013/0607; B64D 15/04; F25B 25/005
See application file for complete search history.

(56) References Cited

U.S. PATENT DOCUMENTS

| | | | | |
|---|---|---|---|---|
| 4,283,924 A * | 8/1981 | Schutze | ................. | B64D 13/06 62/89 |
| 4,397,664 A * | 8/1983 | Kramers | ............... | F25B 49/022 62/183 |
| 5,086,622 A * | 2/1992 | Warner | .................. | B64D 13/06 62/88 |
| 5,918,472 A | 7/1999 | Jonqueres | | |
| 10,239,624 B2 | 3/2019 | Behrens et al. | | |
| 11,661,197 B2 | 5/2023 | Lo | | |
| 2001/0004837 A1* | 6/2001 | Sauterleute | ............ | B64D 13/06 62/402 |
| 2004/0014419 A1* | 1/2004 | Lents | ..................... | B64D 13/06 454/237 |
| 2011/0005244 A1* | 1/2011 | Finney | ...................... | F25B 9/06 62/87 |
| 2015/0013355 A1* | 1/2015 | Klimpel | ................. | B64D 13/08 62/89 |

(Continued)

*Primary Examiner* — David J Teitelbaum
(74) *Attorney, Agent, or Firm* — CANTOR COLBURN LLP

(57) ABSTRACT

An environmental control system (ECS) of an aircraft, having a case; a vaper compression system (VCS) having a compressor and a driven shaft coupled to the compressor, wherein the compressor and the driven shaft are sealed within the case; and a four-wheel air cycle machine (ACM) including a first turbine and a drive shaft coupled to the first turbine and which are outside the case, a second turbine connected to the first turbine via a second shaft, a second compressor connected to the second turbine via a third shaft, and a fan connected to the second compressor via a fourth shaft, wherein the drive shaft and the driven shaft are coupled to each other via a coupling.

11 Claims, 2 Drawing Sheets

(56) References Cited

U.S. PATENT DOCUMENTS

| | | | | |
|---|---|---|---|---|
| 2017/0057641 | A1* | 3/2017 | Koerner | F25B 25/005 |
| 2017/0292412 | A1* | 10/2017 | Fonseca | F01D 15/005 |
| 2018/0045068 | A1* | 2/2018 | Brinson | F02C 7/32 |

* cited by examiner

ENVIRONMENTAL CONTROL SYSTEM UTILIZING INTEGRATED VAPOR COMPRESSION SYSTEM AND FOUR-WHEEL AIR CYCLE MACHINE

BACKGROUND

The embodiments are directed to an environmental control system (ECS) for aircraft and more specifically to an ECS utilizing an integrated vapor compression system (VCS) and a four-wheel air cycle machine (ACM).

Within an environmental control system (ECS) of an aircraft, a vapor cycle system (VCS) may be efficient for conditioning bleed air or recirculated air utilized for a cargo bay. Air conditioned by the ACMs for a cabin may be sourced from engine bleed or a cabin air compressor (CAC). The CAC may be utilized when the aircraft is on the ground and the engines are not running. Heat exchangers in these systems may utilize cooling air for cooling purposes. A VCS includes a compressor, which may be powered by a motor. The complexity of these separate systems and, for example, the utilization of the motor, may result in efficiency losses.

BRIEF DESCRIPTION

Disclosed is an environmental control system (ECS) of an aircraft, including a case; a vaper compression system (VCS) having a compressor and a driven shaft coupled to the compressor, wherein the compressor and the driven shaft are sealed within the case; and a four-wheel air cycle machine (ACM) including a first turbine and a drive shaft coupled to the first turbine and which are outside the case, a second turbine connected to the first turbine via a second shaft, a second compressor connected to the second turbine via a third shaft, and a fan connected to the second compressor via a fourth shaft, wherein the drive shaft and the driven shaft are coupled to each other via a coupling.

In addition to one or more aspects of the ECS or as an alternate, the ACM includes a first heat exchanger that is upstream of the first turbine and a second heat exchanger that is between the second compressor and the first turbine.

In addition to one or more aspects of the ECS or as an alternate, the heat exchangers are crossflow heat exchangers.

In addition to one or more aspects of the ECS or as an alternate, the coupling is a magnetic coupling.

In addition to one or more aspects of the ECS or as an alternate, the coupling is an electromagnetic coupling.

In addition to one or more aspects of the ECS or as an alternate, the coupling is a gear coupling.

In addition to one or more aspects of the ECS or as an alternate, the coupling is a clutch coupling.

In addition to one or more aspects of the ECS or as an alternate, the VCS includes a condenser, an evaporator and an expansion device arranged in a cycle with the compressor, and wherein the evaporator receives and cools a first airflow and directs the first airflow toward a cargo bay of the aircraft.

In addition to one or more aspects of the ECS or as an alternate, the first heat exchanger receives cooling air and directs a second airflow to the first turbine, and the first turbine extracts energy from the second airflow to drive the compressor.

In addition to one or more aspects of the ECS or as an alternate, the ACM includes a water separator that receives the second airflow from the first turbine and removes water from the second airflow; and the second turbine that is connected to the first turbine via the second shaft, wherein the second turbine receives the second airflow from the water separator and the first and second turbines drive the compressor, wherein the second airflow is directed from the second turbine toward a cabin of the aircraft.

In addition to one or more aspects of the ECS or as an alternate, the ECS further includes a first conduit between the first turbine and the first heat exchanger, and a first control valve in the first conduit; a second conduit between the first turbine and the water separator, and a second control valve in the second conduit; a third conduit between the first heat exchanger and the water separator, and a third control valve in the third conduit; a further conduit between the first heat exchanger and the second compressor, and a fourth control valve in the further conduit; and an additional conduit between the second heat exchanger and the first turbine, and the second heat exchanger and a fifth control valve are in the additional conduit, with the fifth control valve being closer to the first turbine than the second heat exchanger.

In addition to one or more aspects of the ECS or as an alternate, in operation, closing the first, second, fourth and fifth control valves and opening the third control valve, bypasses the first turbine and the second compressor.

In addition to one or more aspects of the ECS or as an alternate, in operation, closing the first, second and third control valves and opening the fourth and fifth control valves, directs the second airflow through the second compressor, the second heat exchanger, the first turbine and to the cabin.

In addition to one or more aspects of the ECS or as an alternate, wherein the ECS further includes a conduit extending from the evaporator to the cargo bay and another fan is disposed in the conduit to direct air from the cargo bay toward the evaporator to thereby recirculate the first airflow.

In addition to one or more aspects of the ECS or as an alternate, the condenser receives and heats cooling air and directs the cooling air toward a de-icing system.

In addition to one or more aspects of the ECS or as an alternate, the case is hermetically sealed.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus are presented herein by way of exemplification and not limitation with reference to the Figures.

Figure 1:
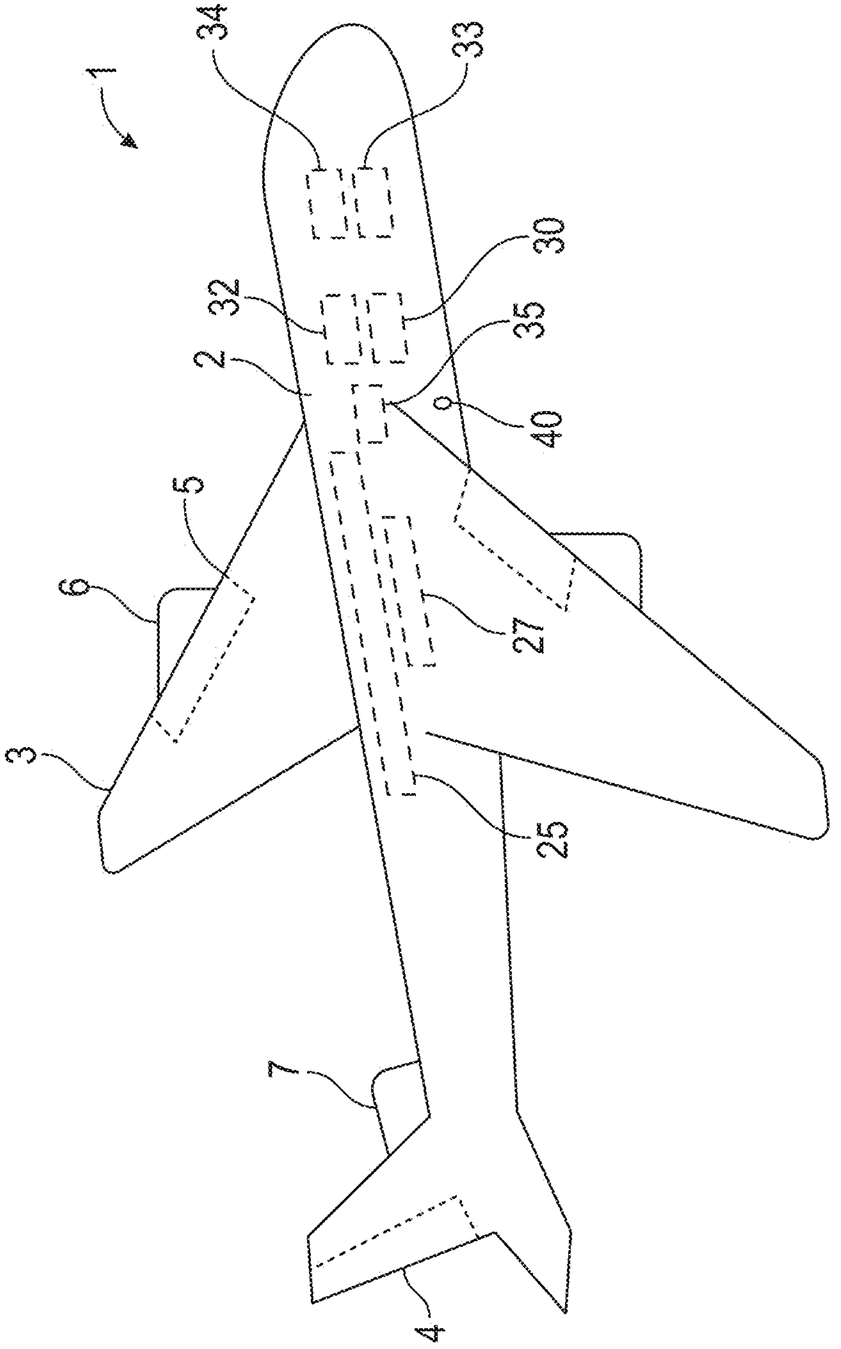
FIG. 1 shows an aircraft that may utilized aspects of the embodiments.

FIG. 1 shows an aircraft 1 having a fuselage 2 with a wing 3 and tail assembly 4, which may have control surfaces 5. The wing 3 may include an engine 6, such as a gas turbine engine, and an auxiliary power unit 7 may be disposed at the tail assembly 4. The aircraft 1 may have a cabin 25, a cargo bay 27, an environmental control system (ECS) 30 for conditioning the cabin 25 and/or cargo bay 27. The ECS 30 may include a vapor compression system (VCS) 32 that cools air directed to, e.g., the cargo bay 27 and provides refrigeration to one or more systems 35 of the aircraft 1, and an air cycle machine (ACM) that cools air directed to e.g., the cabin 25. A RAM air inlet 40 may scoop air for the ECS 30, or the ECS 30 may receive air sourced from, e.g., a cabin air compressor (CAC) 34.

Figure 2:
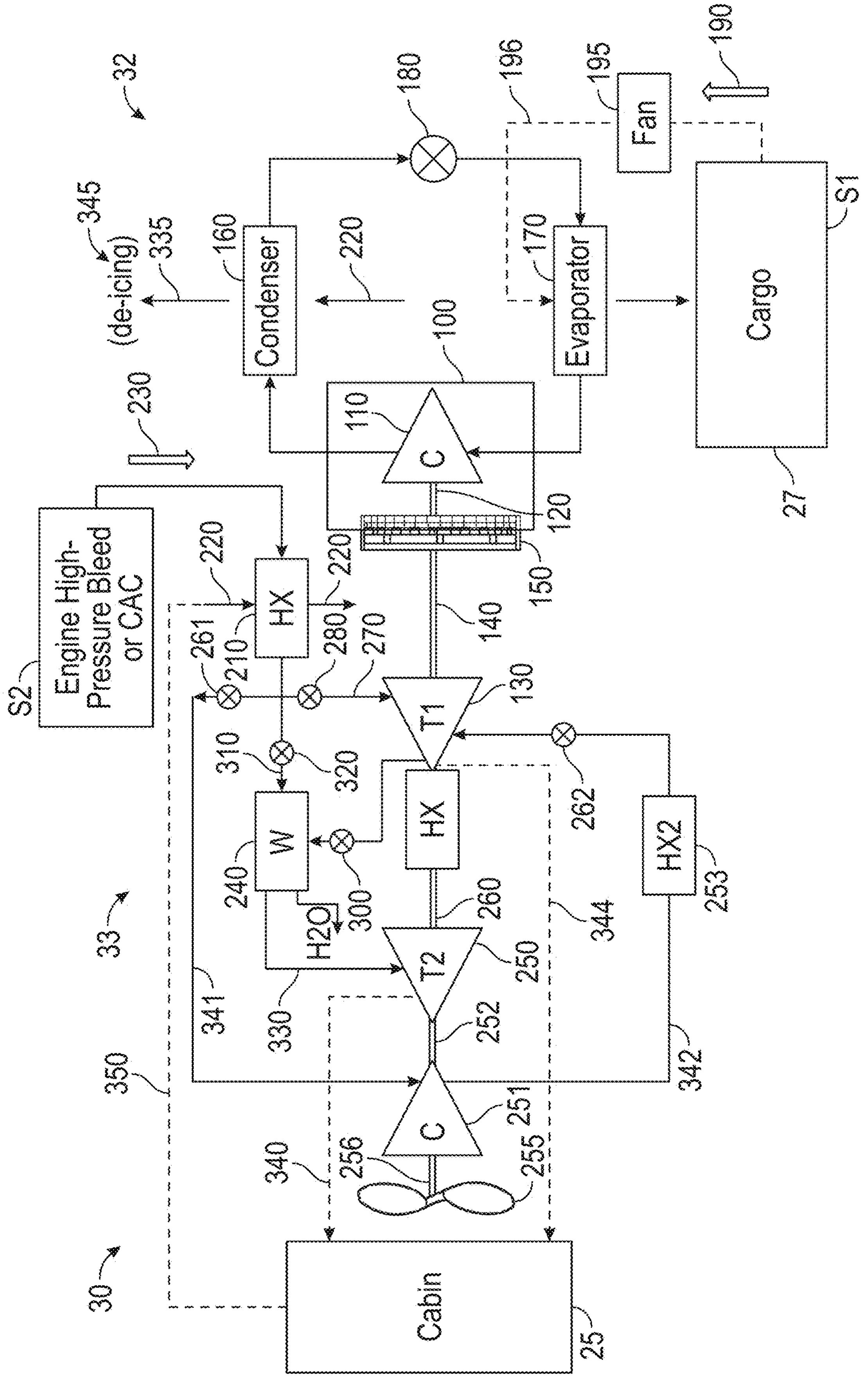
FIG. 2 shows an environmental control system (ECS) of the aircraft utilizing an integrated vapor compression system (VCS) and air cycle machine (ACM).

Turning to FIG. 2, the environmental control system (ECS) 30 of the aircraft 1 includes a case 100. The vaper compression system (VCS) 32 has a (first) compressor 110 and a driven shaft 120 coupled to the compressor 110. The compressor 110 and the driven shaft 120 and the driven half of coupling 150 are sealed, e.g., hermetically, within the case 100.

The air cycle machine (ACM) 33 includes a first turbine 130 and a drive shaft 140 coupled to the first turbine 130, both of which are outside the case 100. The drive shaft 140 and driven shaft 120 are coupled to each other via a coupling 150. In one embodiment, the coupling 150 is a magnetic coupling. In one embodiment, the coupling 150 is an electromagnetic coupling. In one embodiment, the coupling 150 is a gear coupling. In one embodiment, the coupling 150 is a clutch coupling.

The VCS 32 includes a condenser 160, an evaporator 170 and an expansion device 180 (which may be a valve or turbine) arranged in a cycle with the compressor 110. The evaporator 170 receives and cools a first airflow 190 from a first source S1 and directs the first airflow 190 toward the cargo bay 27. The first airflow 190 may be recycled air from the cargo bay 27 that is drawn to the evaporator 170 utilizing a (first) fan 195 (also referred to as another fan) in a conduit 196 extending between the cargo bay 27 and the evaporator 170.

The ACM 33 includes a (first) heat exchanger 210 that is a crossflow heat exchanger that receives cooling air 220 (which may be RAM or cabin air) and directs a second airflow 230, i.e., bleed air, from a second source S2, e.g., high pressure bleed from the engine 6 or a cabin air compressor (CAC), to the first turbine 130. That is, the heat exchanger 210 is upstream of the first turbine 130. The cooling air 220 cools the bleed air and may then be dumped overboard. The first turbine 130 extracts energy from the second airflow to drive the compressor 110. The ACM 33 includes a water separator 240 that receives the second airflow 230 from the first turbine 130 and removes water from the second airflow 230. A second turbine 250 is connected to the first turbine 130 by a second shaft 260. The second turbine 250 receives the second airflow 230 from the water separator 240. The first and second turbines 130, 250 together drive the compressor 110.

The second airflow 230 is directed from the second turbine 250 toward the cabin 25. From the cabin 25, the second airflow 230 may be directed back to the input of the heat exchanger 210, e.g., if the engines 6 are not running.

In the disclosed embodiment, a second compressor 251 is driven by the second turbine 250 via a third shaft 252. The second compressor 251 is fluidly coupled to the heat exchanger 210. A second heat exchanger 253 that is a cross-flow heat exchanger is between the second compressor 251 and the first turbine 130. A second fan 255, which may be a vent fan, is connected to the second compressor 251 via a fourth shaft 256 and indirectly driven by the second turbine 250. The vent fan 255 may be utilized to vent air from the cabin 25 for another venting purpose. Alternatively, the vent fan 255 may be utilized for drawing in cooling air 220 when the aircraft 6 is on the ground. With the second compressor 251 and the fan 255, the ACM 33 defines a four wheel ACM.

In operation, the first turbine 130 reduces the pressure of the second airflow 230 to generate condensate but not to generate ice. The water separator 240 removes the condensate and enables further pressure reduction of the second airflow 230 without generating water or ice in the second turbine 250.

As shown in FIG. 2, a first conduit 270 is between the first turbine 130 and the heat exchanger 210, and a first control valve 280 is in the first conduit 270. A second conduit 290 is between the first turbine 130 and the water separator 240, and a second control valve 300 is in the second conduit 290. A third conduit 310 is between the heat exchanger 210 and the water separator 240, and a third control valve 320 is in the third conduit 310. A fourth conduit 330 is between the water separator 240 and the second turbine 250. A fifth conduit 340 is between the second turbine 250 and the cabin 25. A sixth conduit 350 extends between the cabin 25 and the heat exchanger 210 to enable selective recirculation of the second airflow 230. A seventh (further) conduit 341 extends between the first heat exchanger 210 and the second compressor 251 and a fourth control valve 261 is in the seventh conduit 341. An eighth (additional) conduit 342 extends between the second compressor 251 and the first turbine 130, and the second heat exchanger 253 and a fifth control valve 262 are in the eighth conduit 342. Within the eighth conduit 342, the fifth control valve 262 is closer to the first heat exchanger 130 than the second heat exchanger 253.

Under certain conditions, the first turbine 130 and second compressor 251 may be bypassed by closing the first, second, fourth and fifth control valves 280, 300, 261, 262 and opening the third control valve 320. This may be desired when the cooling or pressure reduction requirements may be sufficiently addressed by the second turbine 250 and the VCS 32 is not needed to run. Alternatively, in normal operating conditions, the third, fourth and fifth control valves 320, 261, 262 may be closed and the first and second control valves 280, 300 may be opened to bypass the second compressor 251.

In one mode of operation, the first, second and third control valves 280, 300, 320, are closed and the fourth and fifth control valves 261, 262 are opened. The second airflow 230 from the first heat exchanger 210 is directed to the second compressor 251 via a conduit 341. From there the compressed air is directed to a second heat exchanger 253 via another conduit 342 and cooled. From the second heat exchanger 253, the second airflow 230 is directed to the first turbine 130 via a further conduit 343, where energy is removed to drive both the first and second turbines and the vent fan. The second airflow 230 is then directed via an additional conduit 344 to the cabin. In this configuration, the first heat exchanger 210 is utilized to prevent the second compressor 251 from overheating. The combination of the second compressor 251, the second heat exchanger 253 and the first turbine 130 function as a typical ACM. As such, a typical ACM and a typical VCS are coupled to each other in the disclosed system via the coupling 150 so the first turbine 130 can run both systems 32, 33 of the ECS 30 rather than, e.g., requiring a motor to run the VCS 32.

As also shown in FIG. 2, the conduit 196 between the evaporator 170 and the cargo bay 27 is the ninth conduit. The fan 195 may be utilized to circulate the first airflow 190 through the ninth conduit 196 for maintaining the desired cooled temperature in the cargo bay 27. The cooling air 220 may be directed over the condenser 160 and heated. In one embodiment, a tenth conduit 335 directs the heated cooling air 220 toward a de-icing system 345 of the aircraft 6.

With the disclosed embodiments, a relatively higher pressure engine bleed may be utilized instead of a typical ACM compressor. Power from two ACM turbines 130, 250 may be utilized to drive the VCS compressor 110. As a result a VCS motor, an ACM compressor and secondary HX that are typically utilized are eliminated. Further the coupling 150 enables an ability to select different rotational speeds for the drive and driven shafts 140, 120 on the ACM side and the VCS side of the coupling 150 to enable efficient operation of these systems.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An environmental control system (ECS) of an aircraft, comprising:

a case; a vaper compression system (VCS) having a compressor and a driven shaft coupled to the compressor, wherein the compressor and the driven shaft are sealed within the case; and a four-wheel air cycle machine (ACM) including a first turbine and a drive shaft coupled to the first turbine and which are outside the case, a second turbine connected to the first turbine via a second shaft, a second compressor connected to the second turbine via a third shaft, and a fan connected to the second compressor via a fourth shaft, wherein the drive shaft and the driven shaft are coupled to each other via a coupling, wherein the ACM includes a first heat exchanger that is upstream of the first turbine and a second heat exchanger that is between the second compressor and the first turbine, the VCS includes a condenser, an evaporator and an expansion device arranged in a cycle with the compressor, and wherein the evaporator receives and cools a first airflow and directs the first airflow toward a cargo bay of the aircraft, the first heat exchanger receives cooling air and directs a second airflow to the first turbine, and the first turbine extracts energy from the second airflow to drive the compressor, the ACM further includes: a water separator that receives the second airflow from the first turbine and removes water from the second airflow; and the second turbine that is connected to the first turbine via the second shaft, wherein the second turbine receives the second airflow from the water separator and the first and second turbines drive the compressor, wherein the second airflow is directed from the second turbine toward a cabin of the aircraft; and a first conduit between the first turbine and the first heat exchanger, and a first control valve in the first conduit; a second conduit between the first turbine and the water separator, and a second control valve in the second conduit; a third conduit between the first heat exchanger and the water separator, and a third control valve in the third conduit; a further conduit between the first heat exchanger and the second compressor, and a fourth control valve in the further conduit; and an additional conduit between the second heat exchanger and the first turbine, and the second heat exchanger and a fifth control valve are in the additional conduit, with the fifth control valve being closer to the first turbine than the second heat exchanger.

2. The ECS of claim 1, wherein the first and second heat exchangers are crossflow heat exchangers.

3. The ECS of claim 1, wherein the coupling is a magnetic coupling.

4. The ECS of claim 1, wherein the coupling is an electromagnetic coupling.

5. The ECS of claim 1, wherein the coupling is a gear coupling.

6. The ECS of claim 1, wherein the coupling is a clutch coupling.

7. A method of operating the ECS of claim 1, wherein in operation, closing the first, second, fourth and fifth control valves and opening the third control valve, bypasses the first turbine and the second compressor.

8. The method of claim 7, wherein in operation, closing the first, second and third control valves and opening the fourth and fifth control valves, directs the second airflow through the second compressor, the second heat exchanger, the first turbine and to the cabin.

9. The ECS of claim 1, further including a conduit extending from the evaporator to the cargo bay and another fan is disposed in the conduit to direct air from the cargo bay toward the evaporator to thereby recirculate the first airflow.

10. The ECS of claim 1, wherein the condenser receives and heats cooling air and the heated cooling air is directed toward a de-icing system.

11. The ECS of claim 1, wherein the case is hermetically sealed.

* * * * *